Jan. 9, 1951　　　O. L. AABY　　　2,537,437
BATHTUB SUPPLY BRACKET
Filed Feb. 3, 1947
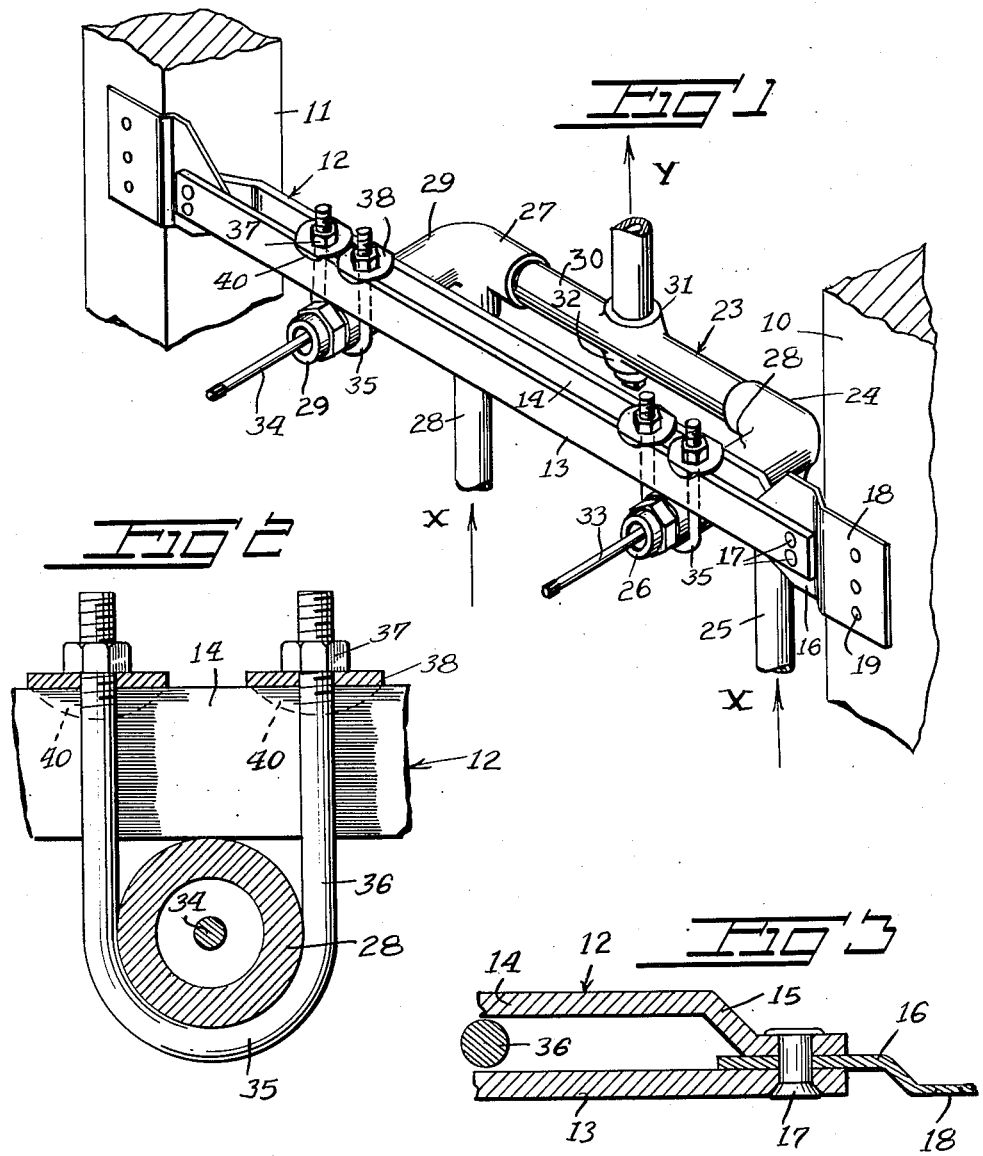
Inventor
Oscar L. Aaby
By Wilfred E. Lawson
Attorney

UNITED STATES PATENT OFFICE 2,537,437

BATHTUB SUPPLY BRACKET

Oscar L. Aaby, Woodville, Wis.

Application February 3, 1947, Serial No. 726,099

4 Claims. (Cl. 248—57)

The present invention relates to a bracket or fitting for the hot and cold water supply faucets for built in bath tubs and showers. This bracket is intended to replace the formerly used metal straps for securing such faucets on the iron pipes, when now instead, soft copper tubing is used extensively, my new bracket will support the faucets directly instead of as formerly, clamping the faucets on the iron pipes.

This bracket is made to fit between and to the regular sixteen inch studding centers and it is adjustably fixed thereon to take any make of bath faucets. It is easy to install and permits adjustment of positioning as regards the tub.

This bracket is of very simple construction from readily obtainable standard inexpensive material, needing no machining and can accordingly be manufactured cheaply and in great number in a very short time.

These and other objects and advantages will be readily understood from the subjoined description with the aid of the attached drawing.

One embodiment of the invention is illustrated in the drawing wherein like numerals relate to the same details in the different views:

Figure 1 is a perspective view of the bracket with the water piping and faucets supported thereby, between the studding centers for the bath tub;

Figure 2 is a cross section of a faucet taken lengthways between the two brackets rods, and showing the supporting clevis;

Figure 3 is a fragmentary horizontal section showing the joining of the element of which the bracket is composed.

In the drawing, numerals 10 and 11 represent the right and left uprights or regular studding centers between which the bracket, denoted in general by numeral 12, is carried. This bracket consists of two rods, a front rod 13 and a rear rod 14 spaced parallel to each other. These rods are both made of narrow band iron of equal over all lengths and of which the front rod 13 is straight, but the rear rod has a bend 15 to meet the end of said bracket 12. Between each bent end of rod 14 and the adjacent end of the front rod 13 is a mounting plate 16, secured by rivets or bolts 17 to the ends of the rod whereby the parts are joined to form a unit.

The length of the rods 13, 14 is substantially equal to the distance between the uprights or studding 10 and 11, and the securing plates 16 are broadened, vertically, as at 18, and extend beyond the ends of the rods 13, 14 in order to be secured, as by screws or nails 19, against the front faces of said uprights. In other words, the total length of the bracket 12, which includes the two rods 13, 14 and two securing plates 16, is so much greater than the span between the uprights 10, 11 that the broad portion 18 may reach across to be attached to the uprights, see Figure 1. There is indicated an outward bend of the broad securing portion 18, which bend is provided in order to insure that the front face of bracket 12 becomes flush with the correspondent face of the uprights 10 and 11.

The bracket 12, positioned as just described, is now ready to receive the combined water supply and faucet unit, denoted in general by number 23. This unit is of standard type and forms no part of the present invention, being described only to exemplify the application of this invention.

The water supply unit 23 consists of a right knee 24 with a shank 25 for furnishing water from a hot supply, and a hand operated faucet 26; and a left knee 27 with a shank 28 furnishing water from a cold supply, and a hand operated faucet 29. Between the two knees 24 and 27 is provided a short connecting pipe 30, threaded into both knees and being provided with a nipple opening both on top and bottom as at 31 and 32 to supply water to the bath tub or the shower, respectively; one of which may be plugged up while the other is being used alone, or both may be used together. The amount of water supply may be regulated as desired by handles on the valve spindles 33, 34. This supply of water thru shanks 25 and 28 is denoted by arrows X, while the water from the unit 23 for the bath and the shower is denoted by arrows Y.

The water supply unit is now attached beneath the bracket 12 by means of a pair of U-bolts 35, each with two threaded shanks 36, between which is placed one of the knee legs 28 or 29 and drawn up tightly under the bottom edges of the rods 13 and 14 by tightening the securing nuts 37 over the washers 38, which bridge across the top edges of rods 13 and 14, and between which the clevis shanks 36 are housed. The washers 38 may have bent down side edges 40 for gripping the rods and prevent their turning, when the nuts are tightened.

By consulting Figure 1, it will be evident that the supply unit 23 may be positioned centrally or to one side in the span between the uprights 10 and 11. It will also be clear that the bracket 12 together with said unit 23 may be located higher or lower on said uprights as best suited for the occasion. Lastly, it is also possible to locate the supply unit further in or out in the space between the uprights, by loosening and retightening the nuts 37 for such shifting.

By the use of the described bracket the clamping of any standard bath supply faucet thereto is now possible, thereby eliminating all other supporting means for the water supply pipes to the faucets. It is therefore possible to have copper tubing all the way to the faucet, which is a definite advantage over present day usage.

It is to be understood that the invention as herein disclosed may be varied from the details described and shown without departure from the spirit of the subjoined claims.

I claim:

1. A bracket for supporting a water supply unit between adjacent studding, comprising two long flat bars disposed in spaced side by side relation with their wide faces opposed, one of said bars being straight throughout and the other bar having a portion at each end formed to provide an obliquely angled part and a straight terminal part in off-set parallel relation with the bar proper, a pair of mounting plates, each of said mounting plates having a portion interposed between an end of the straight bar and a terminal part of the adjacent bar, means passing through and securing together each plate and the adjacent ends of the two bars, each of said plates also having an outer end portion apertured to receive securing elements whereby the plate may be secured to a face of a studding, the said bars being maintained by the mounting plates with the space between the bars directed vertically when the bracket is employed for supporting horizontal parts of the water supply unit, a U-bolt having spaced parallel legs extending between the bars, the free ends of the legs being threaded, washer members resting upon the top edges of the bars and having the ends of the U-bolt legs passing therethrough, and nuts threaded upon the upper ends of the U-bolt legs and bearing against the washers, the U-bolts being of a length materially greater than the width of the bars whereby the connecting portion between the legs thereof is located below the lower edges of the bars for the suspension of the said horizontal part of the water supply unit.

2. A bracket of the character described in claim 1 wherein each of said mounting plates is angled intermediate its inner and outer portions whereby the said inner and outer portions are positioned in off-set parallel planes to effect the positioning of the bars in between a pair of studdings when the outer portions of the mounting plates are secured to the faces of the studding.

3. A bracket for supporting a service unit between adjacent wall studding, comprising two long bars disposed in spaced side by side relation, one of said bars being straight throughout and the other bar having a portion at each end formed to provide an obliquely angled part and a straight terminal part in off-set parallel relation with the bar proper, a pair of mounting plates, each of said mounting plates having a portion interposed between an end of the straight bar and a terminal part of the adjacent bar, means securing each plate to the adjacent ends of the two bars, each of said plates also having an outer end portion apertured to receive securing elements whereby the plate may be secured to a face of a studding, the said bars being maintained by the mounting plates with the space between the bars directed vertically when the bracket is employed for supporting horizontal parts of the service unit, a U-bolt having spaced parallel legs extending between the bars, the free ends of the legs being threaded, washer members engaging against and bridging the space between the bars and having the ends of the U-bolt legs passing therethrough, and nuts threaded upon the ends of the U-bolt legs and bearing against the washers, the U-bolts being of a length materially greater than the width of the bars whereby the connecting portion between the legs thereof is located beyond the sides of the bars remote from the washer members for securing said service unit to the bars.

4. A bracket for supporting a service unit between adjacent wall studding, comprising two long bars disposed in side by side relation, one of said bars being straight throughout and the other bar having a portion at each end formed to provide an obliquely angled part and a straight terminal part in off-set parallel relation with the bar proper, a pair of mounting plates, each of said mounting plates having a portion interposed between an end of the straight bar and a terminal part of the adjacent bar, the remaining portion of each mounting plate being in off-set relation with the portion secured between the bar ends, the said one of the bars having a flat face substantially in the plane of the forward face of said remaining portion of each plate, means securing each plate to the adjacent ends of the two bars, the said remaining portion of each plate being apertured to receive securing elements whereby the plate may be secured to a face of a studding, a U-bolt having spaced legs disposed between the bars, the bolt being of a length materially greater than the width of the bars, a bridging means disposed across and engaging against the bars and having the ends of the U-bolt legs passing therethrough, and nuts threaded on the said ends of the U-bolt legs and bearing against said bridging means.

OSCAR L. AABY.

REFERENCES CITED

The following references are of record in the file of this patent:

UNITED STATES PATENTS

| Number | Name | Date |
|---|---|---|
| 858,140 | Beaton | June 25, 1907 |
| 1,213,865 | Gunn | Jan. 30, 1917 |
| 1,354,920 | Seiler | Oct. 5, 1920 |
| 1,789,124 | Wever | Jan. 13, 1931 |